United States Patent
Lee et al.

(10) Patent No.: US 9,357,883 B2
(45) Date of Patent: Jun. 7, 2016

(54) FOOD PROCESSOR

(71) Applicant: TSANN KUEN (ZHANGZHOU) ENTERPRISE CO., LTD., Zhang Zhou, Fujian (CN)

(72) Inventors: Hei-Wang Lee, Tainan (TW); Chieh-Wen Lin, Tainan (TW); Wenxia Zhang, Zhang Zhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 210 days.

(21) Appl. No.: 14/077,858

(22) Filed: Nov. 12, 2013

(65) Prior Publication Data
US 2014/0131493 A1 May 15, 2014

(30) Foreign Application Priority Data
Nov. 12, 2012 (CN) .................... 2012 2 0599018 U

(51) Int. Cl.
A47J 43/00 (2006.01)
A47J 43/07 (2006.01)
A47J 43/046 (2006.01)

(52) U.S. Cl.
CPC ............ *A47J 43/0722* (2013.01); *A47J 43/046* (2013.01); *A47J 43/00* (2013.01)

(58) Field of Classification Search
CPC ......... A47J 43/00; A47J 43/04; A47J 43/046; A47J 43/0722

USPC .................................................. 241/92, 278.1
See application file for complete search history.

(56) References Cited

U.S. PATENT DOCUMENTS

| 2,852,200 | A | * | 9/1958 | Holzer | 241/92 |
| 3,892,365 | A | * | 7/1975 | Verdun | 241/92 |
| 5,537,918 | A | * | 7/1996 | Patel et al. | 99/510 |
| 6,050,180 | A | * | 4/2000 | Moline | 99/511 |
| 7,226,012 | B2 | * | 6/2007 | Pai | 241/273.2 |
| 7,328,864 | B2 | * | 2/2008 | Narai et al. | 241/92 |
| 7,481,155 | B2 | * | 1/2009 | Larsen | 99/511 |
| 7,681,817 | B2 | * | 3/2010 | Orent | 241/92 |
| 8,051,887 | B2 | * | 11/2011 | Robinson et al. | 144/373 |
| 8,794,133 | B2 | * | 8/2014 | Fister et al. | 99/503 |
| 2003/0052206 | A1 | * | 3/2003 | Fouquet | 241/92 |
| 2006/0011760 | A1 | * | 1/2006 | Hsu | 241/92 |
| 2007/0210193 | A1 | * | 9/2007 | Larsen | 241/92 |
| 2008/0202355 | A1 | * | 8/2008 | Krall et al. | 99/513 |

* cited by examiner

*Primary Examiner* — Faye Francis
(74) *Attorney, Agent, or Firm* — Rabin & Berdo, P.C.

(57) ABSTRACT

A food processor includes a base, a processing box and at least a cutter. The base is disposed with a motor inside, the motor is disposed with a rotating shaft; the processing box is assembled to the base and is disposed with a charging opening and a discharging opening. The cutter rotates synchronously with the rotating shaft of the motor, the cutter is assembled inside the processing box and is disposed with a cutter dish with several dropping grooves and several blades fixed on the cutter dish, the blade has several sets of cutter teeth arranged side by side, each set of cutter teeth has at least a large cutter tooth and at least a small cutter tooth.

13 Claims, 11 Drawing Sheets

FOOD PROCESSOR

FIELD OF THE INVENTION

The present invention relates to a food processor.

BACKGROUND OF THE INVENTION

The conventional food processor has same size cutter teeth, so that the processed food is neither fine nor good-tasting, the food is large grained. Besides, it can not make different food according to different food, the processor is single functional.

SUMMARY OF THE INVENTION

The present invention is provided with a food processor, which overcomes the disadvantages of the conventional technology. The technical processor of the present invention to solve the technical problems is as below:

A food processor, wherein comprises:
  a base (100), which is disposed with a motor (110) inside, the motor (110) is disposed with a rotating shaft;
  a processing box (200), which is assembled to the base (100) and is disposed with a charging opening (210) and a discharging opening (220); and
  at least one cutter (300), which rotates synchronously with the rotating shaft of the motor (110), the cutter (300) is assembled inside the processing box (200) and is disposed with a cutter dish (310) with several dropping grooves (311) and several blades (320) fixed on the cutter dish (310), the blade (320) has several sets of cutter teeth arranged side by side, each set of cutter teeth has at least a large cutter tooth (321) and at least a small cutter tooth (322).

In another preferred embodiment, the dropping grooves (311) pass through the cutter dish (310) from up to down and the number thereof is the same as the blades (320), the dropping grooves (311) are arranged in an annular, the blades (320) comprise an assembly portion (330) coupled to the cutter dish (310) and a cutter portion (340) fixed to the assembly portion (330), the several sets of cutter teeth are disposed in the upper end of the cutter portion (340), the dropping groove (311) has two sides, the left side and the right side, the lower end of the cutter portion (340) is extended into the dropping groove (311) and is coupled to contact on the left side of the dropping groove (311), the upper end of the cutter portion (340) is extended out of the assembly portion (330).

In another preferred embodiment, the left side of the dropping groove (311) is an inclined surface, the intersection angle α of the inclined surface and the vertical line of the assembly portion ranges from 20 to 30 degrees.

In another preferred embodiment, the intersection angle α of the inclined surface of the dropping groove (311) and the vertical line of the assembly portion is 22.5 degrees.

In another preferred embodiment, a dropping opening is formed between the dropping groove (311) and the top surface of the cutter dish (310), the distance b of the left side and the right side of the dropping opening ranges from 2.5 to 6.5 mm.

In another preferred embodiment, the right side of the dropping groove (311) is disposed with teeth convex-concave structure (350), the concave portions of the convex-concave structure (350) are corresponding to part or whole of the several sets of cutter teeth one by one.

In another preferred embodiment, the height of the large cutter tooth (321) is different from that of the small cutter tooth (322), the distance between the left side and the right side of the large cutter tooth (321) is different from that of the small cutter tooth (322) and/or the distance between the front side and back side of the large cutter tooth (321) is different from that of the small cutter tooth (322).

In another preferred embodiment, each set of cutter teeth has a large cutter tooth (321) and a small cutter tooth (322), two large cutter teeth (321) and two small cutter teeth (322) or three large cutter teeth (321) and three cutter teeth (322) in order.

In another preferred embodiment, the large cutter tooth and the small cutter tooth respectively have a trapezoid and three sides of triangle, rectangle and triangle.

In another preferred embodiment, the number of the dropping grooves (311) is the same as the blades (320) and the dropping grooves (311) are arranged in an annular, the blade (320) comprises a blade body coupled to assemble to the cutter dish (310), the several sets of cutter teeth are convex and disposed in the edge of the blade body, and the several sets of cutter teeth are aligned with the left side of the dropping groove (311).

In another preferred embodiment, the cutter dish (310) has a shaft sleeve (370) and an annular wall (380) extended from the top end face of the shaft sleeve (370), the dropping groove (311) is disposed on the wall (380), and the blades (320) are assembled on the wall (380), the diameter of the wall (380) gradually tapers from up to down.

In another preferred embodiment, the processing box (200) comprises a lower box (280), a central cover (291) with an opening and an upper box (290) covering the lower box (280) and situated on the central cover (291), an accommodating room (293) is formed between the central cover (291) and the lower box (280), the internal periphery of the lower box (280) is a vertical surface, the upper portion and the lower portion of the external periphery of the central cover (291) are contacted tightly with the lower box (280), the central portion of the external periphery of the central cover (291) is hollow to be a cavity (294), the charging opening (210) is disposed in the upper box (290) and corresponding to the opening of the central cover (291), the discharging opening (220) is disposed in the lower box (280), the cutter (300) is assembled inside the accommodating room (293) formed between the central cover (291) and the lower box (280).

In another preferred embodiment, the external periphery of the central cover (291) is disposed with at least an annular protruding portion (292).

Compared to the conventional technology, the technical proposal of the present invention has advantages as below:
  1. The blade has several sets of cutter teeth, each set of cutter teeth has at least a large cutter tooth and at least a small cutter tooth, it is different from the conventional blade, thus making the processed food fine and good-tasting.
  2. The intersection angle α of the inclined surface of the dropping groove and the vertical line of the assembly portion ranges from 20 to 30 degrees, thus making the processed food more fine and soft, it can make ice cream, fruit cream or fruit ice cream by adding ice.
  3. The distance b of the left side and the right side of the dropping opening ranges from 2.5 to 6.5 mm, thus making the processed food more fine and soft, it can make ice cream, fruit cream or fruit ice cream by adding ice.
  4. The right side of the dropping groove is disposed with teeth convex-concave structure, so that the food is highly cut and ripped, thus making the icy food more fine.
  5. The height of the large and small cutter tooth, the distance between the left and right side and the distance between the front and back side of the large and small cutter tooth can be alternative different, two alternative different or all different, the cutter teeth sets of the blade is simple structural and low cost.
6. The large cutter tooth and the small cutter tooth respectively have a trapezoid and three sides of triangle, rectangle and triangle, this kind of structure thus makes hard food, such as ice or fruit ice, processed to be fine ice shaker or granule crushed ice, it is of simple structure and low in cost.
7. The cutter dish has a shaft sleeve and an annular wall, the diameter of the wall gradually tapers from up to down, this kind of cutter dish is more convenient for hard food, such as ice or fruit ice, to drop to the discharging opening, it is better when the axis of the rotating shaft of the motor is out of alignment with the central line of the base.
8. The internal periphery of the lower box is a vertical surface, the upper portion and the lower portion of the external periphery of the central cover are contacted tightly with the lower box, the central portion of the external periphery of the central cover is hollow to be a cavity, thus making it with better sealing performance.

BRIEF DESCRIPTION OF THE DRAWINGS

The present invention will be further described with the drawings and the embodiments.

DETAILED DESCRIPTION OF THE EMBODIMENTS

Figure 1:
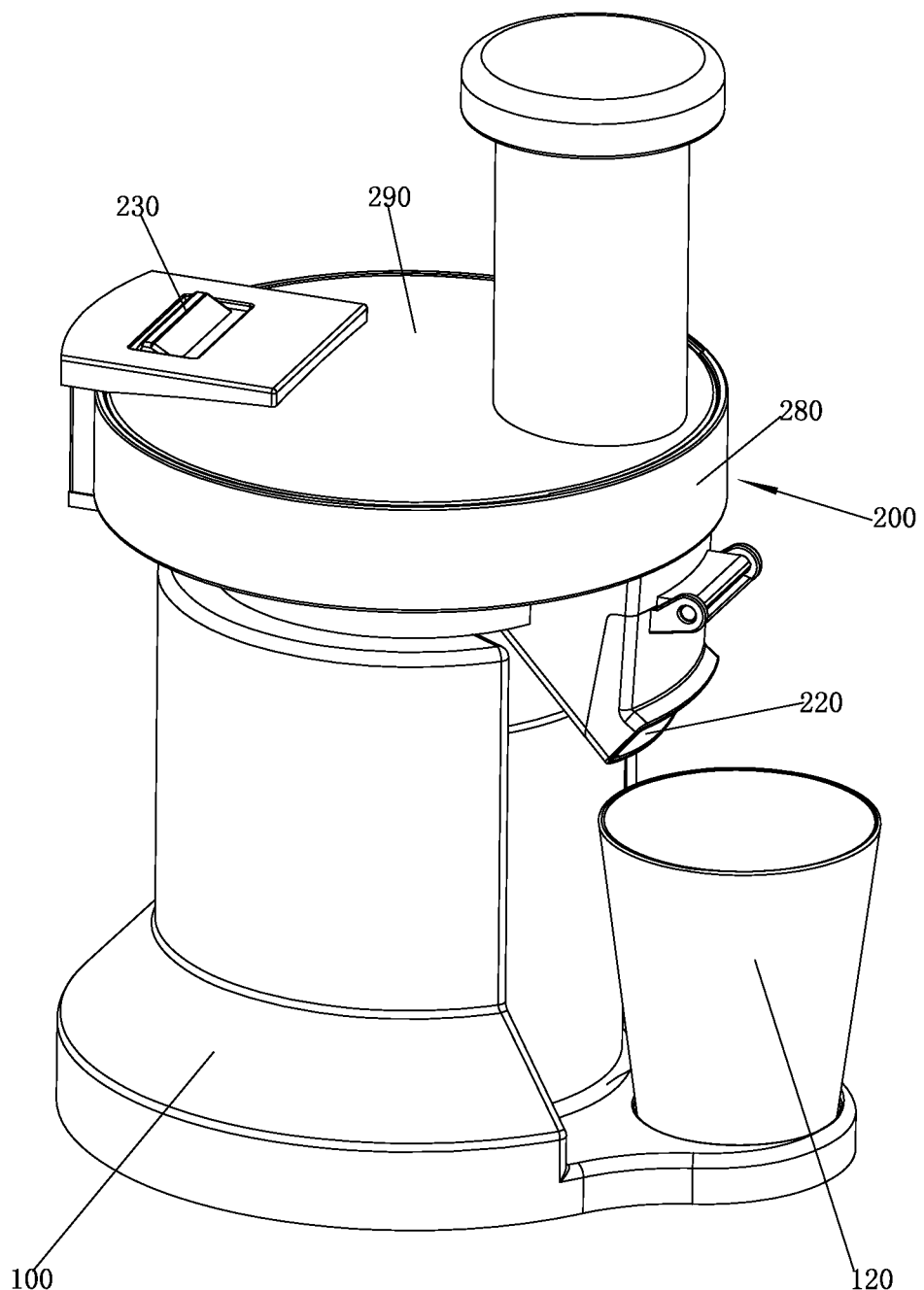
FIG. 1 illustrates a schematic diagram of the food processor of the first embodiment of the present invention.
Figure 2:
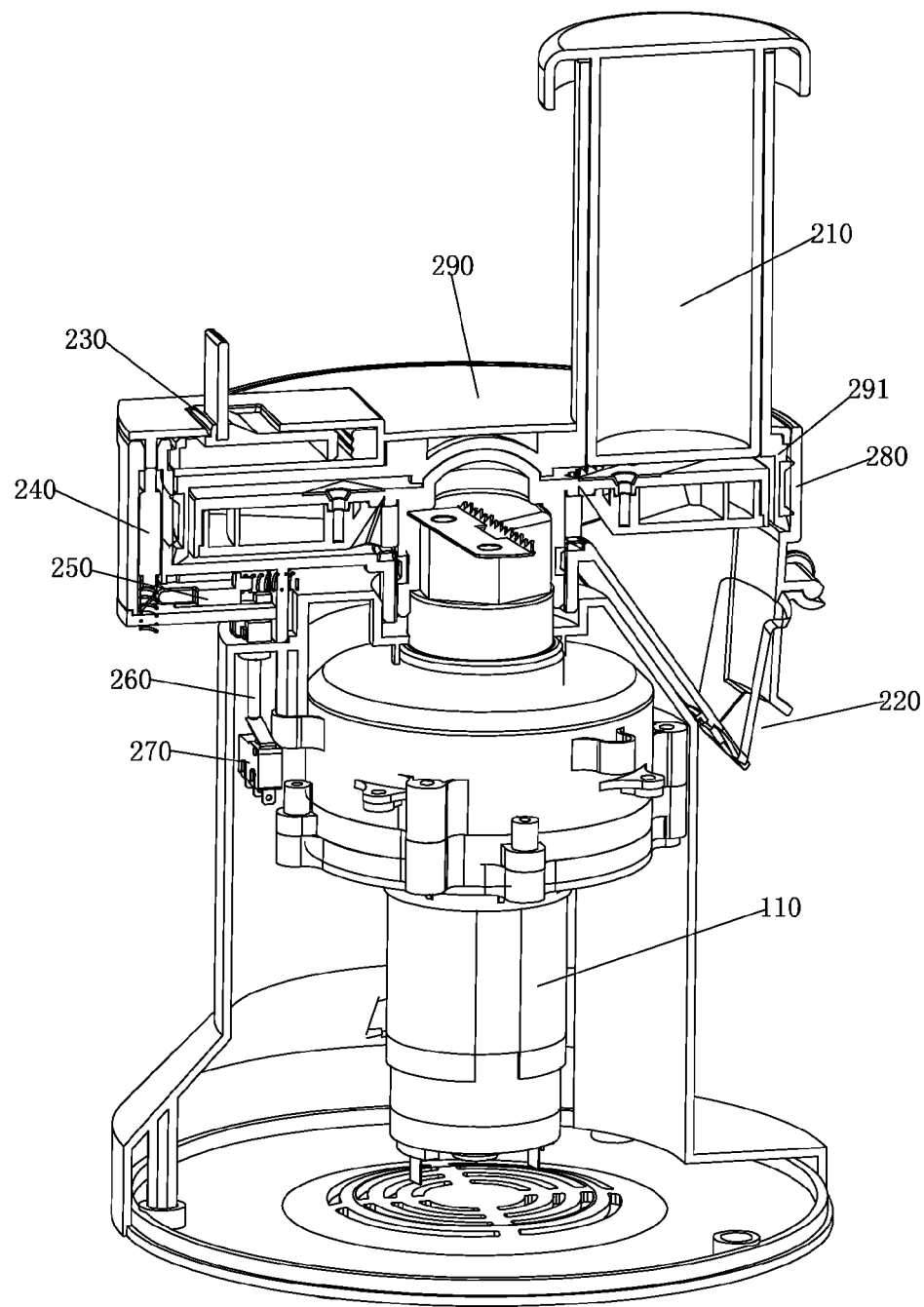
FIG. 2 illustrates a stereo sectional view of the food processor of the first embodiment of the present invention.
Figure 3:
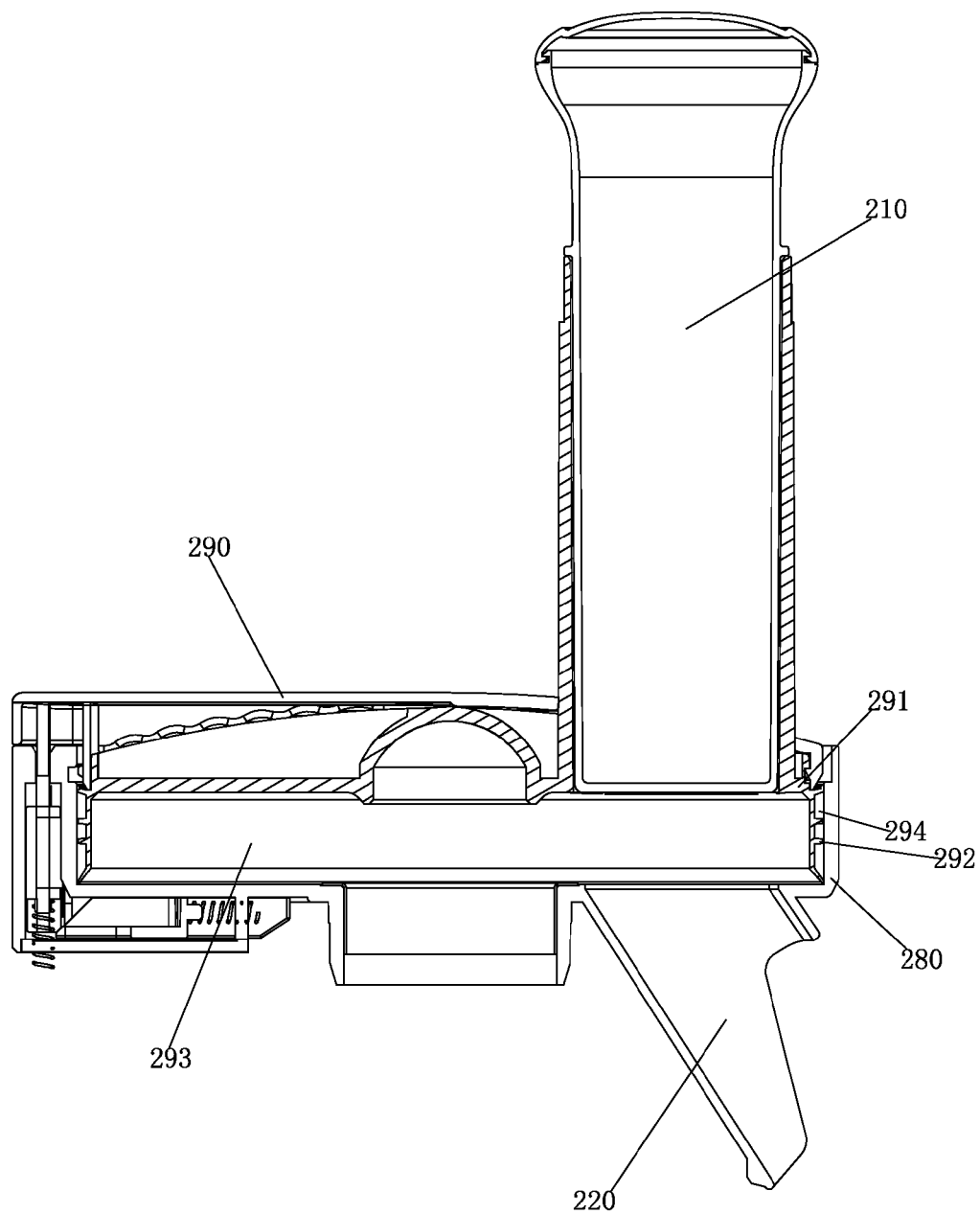
FIG. 3 illustrates a sectional view of the processing box of the food processor of the first embodiment of the present invention.
Figure 4:
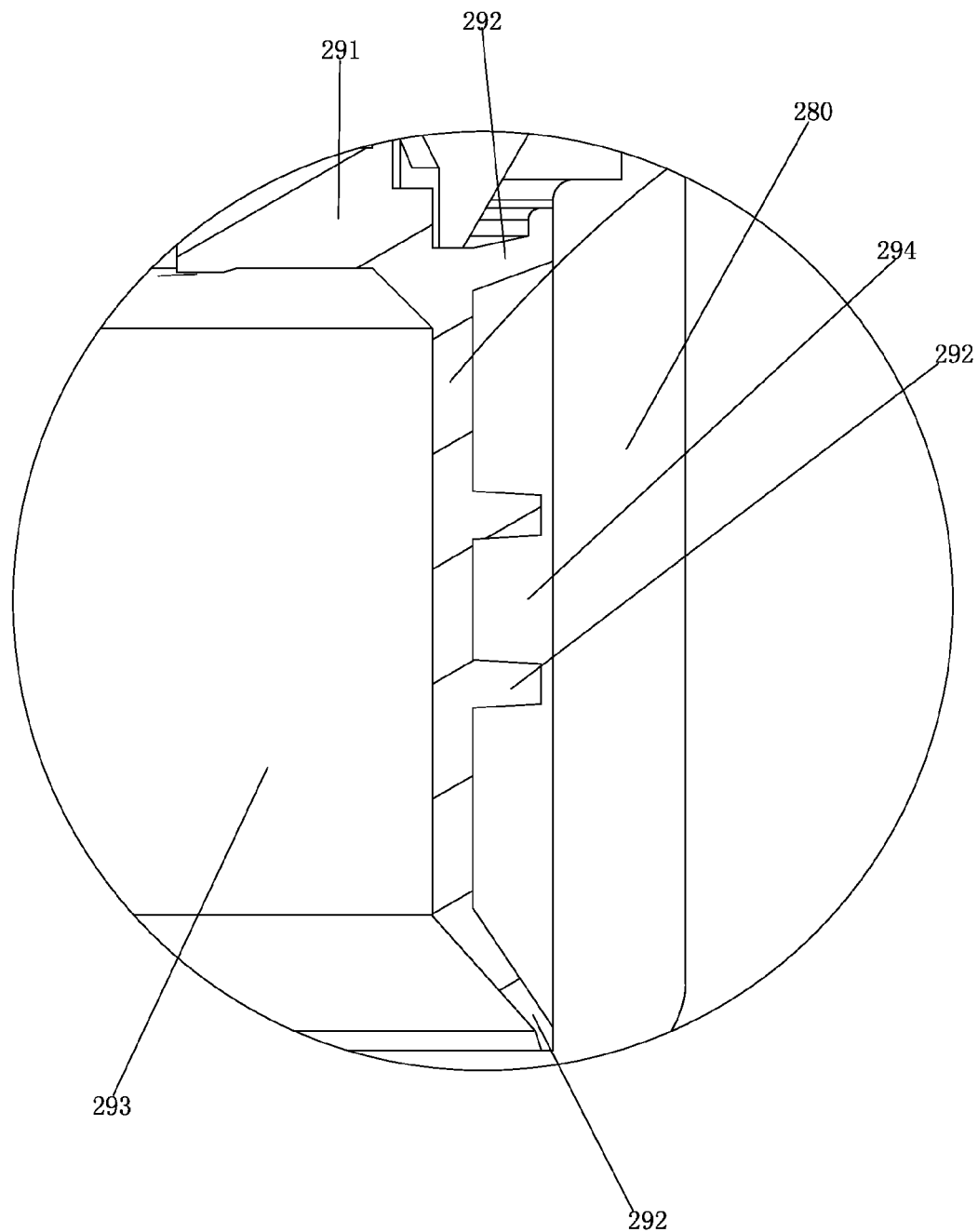
FIG. 4 illustrates a partial enlargement view of the FIG. 3.
Figure 5:
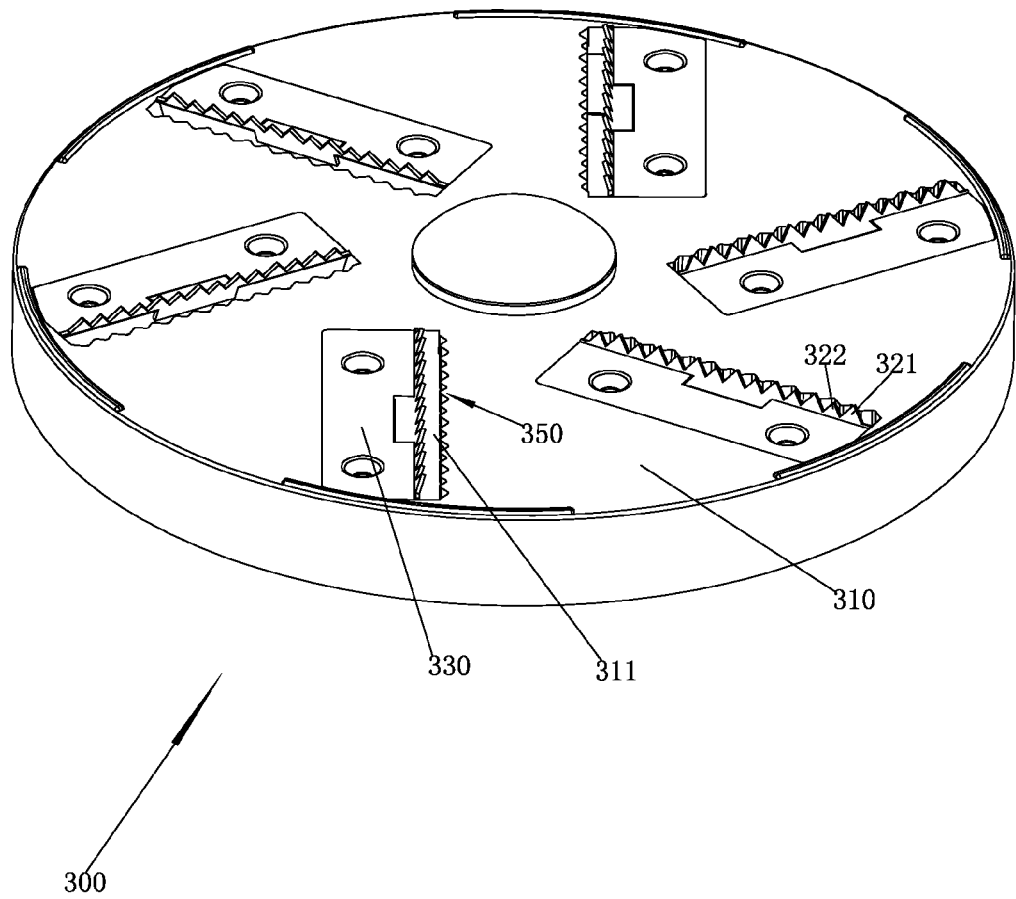
FIG. 5 illustrates a schematic diagram of the cutter of the food processor of the first embodiment of the present invention.
Figure 6:
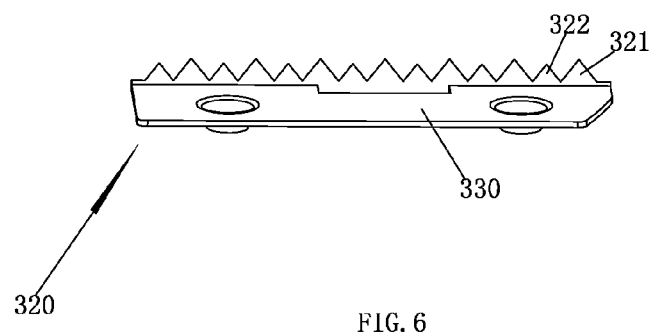
FIG. 6 illustrates a schematic diagram of the blade of the food processor of the first embodiment of the present invention.
Figure 7:
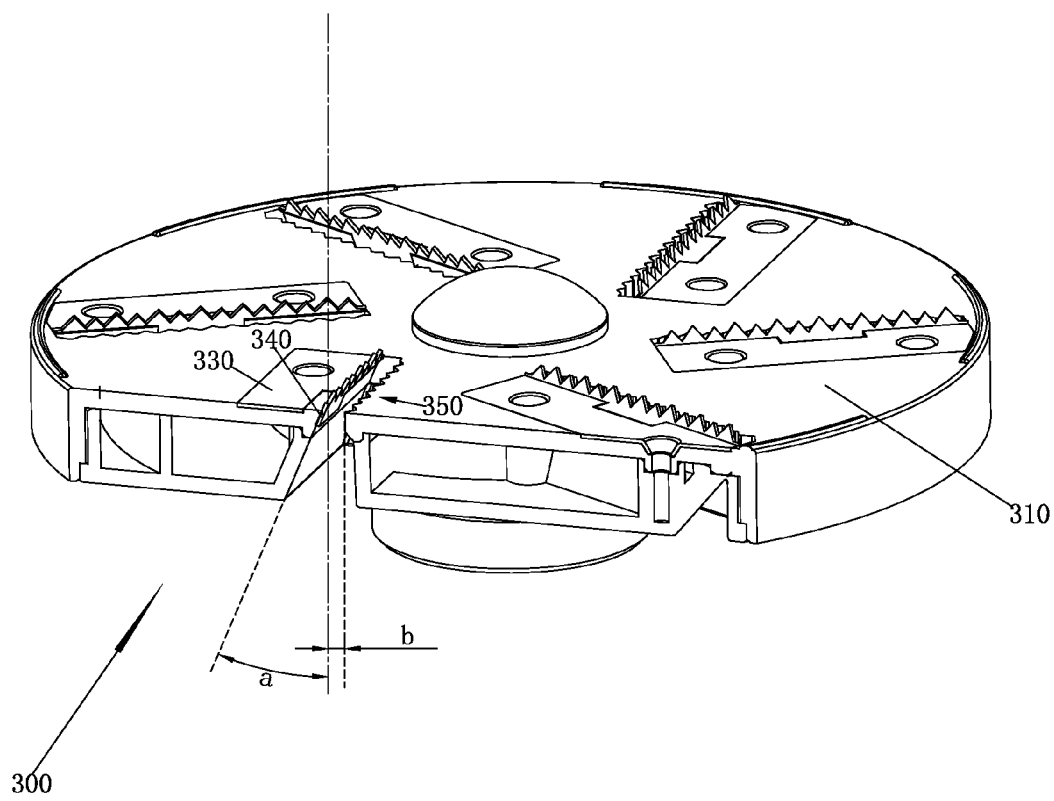
FIG. 7 illustrates a stereo partial sectional view of the cutter of the food processor of the first embodiment of the present invention.

Please refer to FIG. 1 to FIG. 7, disclosed is a food processor in the first embodiment, the food processor comprises a base 100, a processing box 200 and a cutter 300.

The base 100 is disposed with a motor 110, the motor 110 is disposed with a rotating shaft. In this embodiment, the base 100 is further disposed with a cup body 120.

The processing box 200 is assembled to the base 100 and is disposed with a charging opening 210 and a discharging opening 220. The cup body 120 is corresponding to the discharging opening 220. In this embodiment, the processing box 200 comprises a lower box 280, a central cover 291 with an opening and an upper box 290 covering the lower box 280 and situated on the central cover 291. An accommodating room 293 is formed between the central cover 291 and the lower box 280, the internal periphery of the lower box 280 is a vertical surface, the upper portion and the lower portion of the external periphery of the central cover 291 are contacted to the lower box 280 tightly, the central portion of the external periphery of the central cover 291 is hollow to be a cavity 294, thus making it with better sealing performance. The charging opening 210 is disposed in the upper box 290 and is corresponding to the opening of the central cover 291, the discharging opening 220 is disposed in the lower box 280, the cutter 300 is assembled inside the accommodating room 293 formed between the central cover 291 and the lower box 280. In this embodiment, the external periphery of the central cover 291 is disposed with at least an annular protruding portion 292. In this embodiment, there are four annular protruding portions 292 spaced arranged from up to down, the two annular protruding portions 292 in the upper most and the lower most are contacted tightly to the internal periphery of the lower box 280, the other two in the central are away from the internal periphery of the lower box 280. If the internal pressure of the accommodating room 293 increases, two annular protruding portions 292 in the central will contact the internal periphery of the lower box to seal the lower box 280, thus making it with better sealing performance.

In this embodiment, the processing box 200 is assembled on the base 100, and the central line thereof is aligned with the central line of the base 100.

In this embodiment, the food processor further comprises a safety switch mechanism, the safety switch mechanism comprises a lock catch 230 rotatably connected to the upper box 290, a first driving rod 240, a second driving rod 250, a touch rod 260 and a safety switch 270. The first driving rod 240 is connected to the lock catch 230 and the second driving rod 250 in driving way, the second driving rod 250 is connected to the touch rod 260 in driving way, the touch rod 260 can touch the safety switch 270 or be away. When the upper box 290 covers the lower box 280 and the upper box 290 is locked to the lower box 280 by means of the lock catch 230, the driving connection of the first driving rod 240, the second driving rod 250 and the touch rod 260 drives the touch rod 260 to touch the safety switch 270, thus start the motor 110.

The cutter 300 rotates synchronously with the rotating shaft of the motor, the cutter 300 is assembled inside the processing box 200 and is disposed with a cutter dish 310 with several dropping grooves 311 and several blades 320 fixed on the cutter dish 310, the blade 320 has several sets of cutter teeth arranged side by side, each set of cutter teeth has at least a large cutter tooth 321 and at least a small cutter tooth 322. In this embodiment, each set of cutter teeth has a large cutter tooth 321 and a small cutter tooth 322. As needed, each set of cutter teeth can have two large cutter teeth 321 and two small cutter teeth 322 or three large cutter teeth 321 and three cutter teeth 322 in order. In this embodiment, the cutter 300 is assembled inside the accommodating room 293 formed between the central cover 291 and the lower box 280.

In this embodiment, the height of the large cutter tooth 321 is different from that of the small cutter tooth 322, the distance between the left side and the right side of the large cutter tooth 321 is different from that of the small cutter tooth 322 and/or the distance between the front side and back side of the large cutter tooth 321 is different from that of the small cutter tooth 322. In normal situation, the height of the large cutter tooth 321 is higher than that of the small cutter tooth 322, the distance between the left and the right sides of the large cutter tooth 321 is larger than that of the small cutter tooth 322, the distance between the front and the back sides of the large cutter tooth 321 is larger than that of the small cutter tooth 322. In this embodiment, the height of the large cutter tooth 321 is different from that of the small cutter tooth 322, the distance between the left and the right sides of the large cutter tooth 321 is different from that of the small cutter tooth 322, As needed, the height of the large and small cutter tooth, the distance between the left and right sides and the distance between the front and back sides of the large and small cutter tooth can be alternative different, two alternative different or all different, The structure of the cutter teeth sets of the blade is simple and it is low in cost. In this embodiment, the dropping grooves 311 pass through the cutter dish 310 from up to down and the number thereof is the same as the blades 320, the dropping grooves 311 are arranged in an annular, the blade 320 comprises an assembly portion 330 coupled to the cutter dish 310 and a cutter portion 340 fixed to the assembly portion 330, the several sets of cutter teeth are disposed in the upper end of the cutter portion 340, the dropping groove 311 has two sides, the left side and the right side, the lower end of the cutter portion 340 is extended into the dropping groove 311 and is coupled to contact on the left side of the dropping groove 311, the upper end of the cutter portion 340 is extended out of the assembly portion 330.

In this embodiment, the large cutter tooth 321 and the small cutter tooth 322 are triangle shaped.

In this embodiment, the left side of the dropping groove 311 is an inclined surface, the intersection angle α of the inclined surface and the vertical line of the assembly portion ranges from 20 to 30 degrees. Preferred, the intersection angle α is 22.5 degree. So that it makes the processed food more fine and soft, it can make ice cream, fruit cream or fruit ice cream by adding ice.

In this embodiment, a dropping opening is formed between the dropping groove 311 and the top surface of the cutter dish 310, the distance b of the left side and the right side of the dropping opening ranges from 2.5 to 6.5 mm, thus making the processed food more fine and soft, it can make ice cream, fruit cream or fruit ice cream by adding ice.

Preferred, the right side of the dropping groove 311 is disposed with teeth convex-concave structure 350, the concave portions of the convex-concave structure 350 are corresponding to part or whole of the several sets of cutter teeth one by one. In this embodiment, the concave portions of the convex-concave structure 350 are corresponding to whole of the several sets of cutter teeth one by one, so that the food is highly cut and ripped, thus making the icy food more fine and soft.

Figure 8:
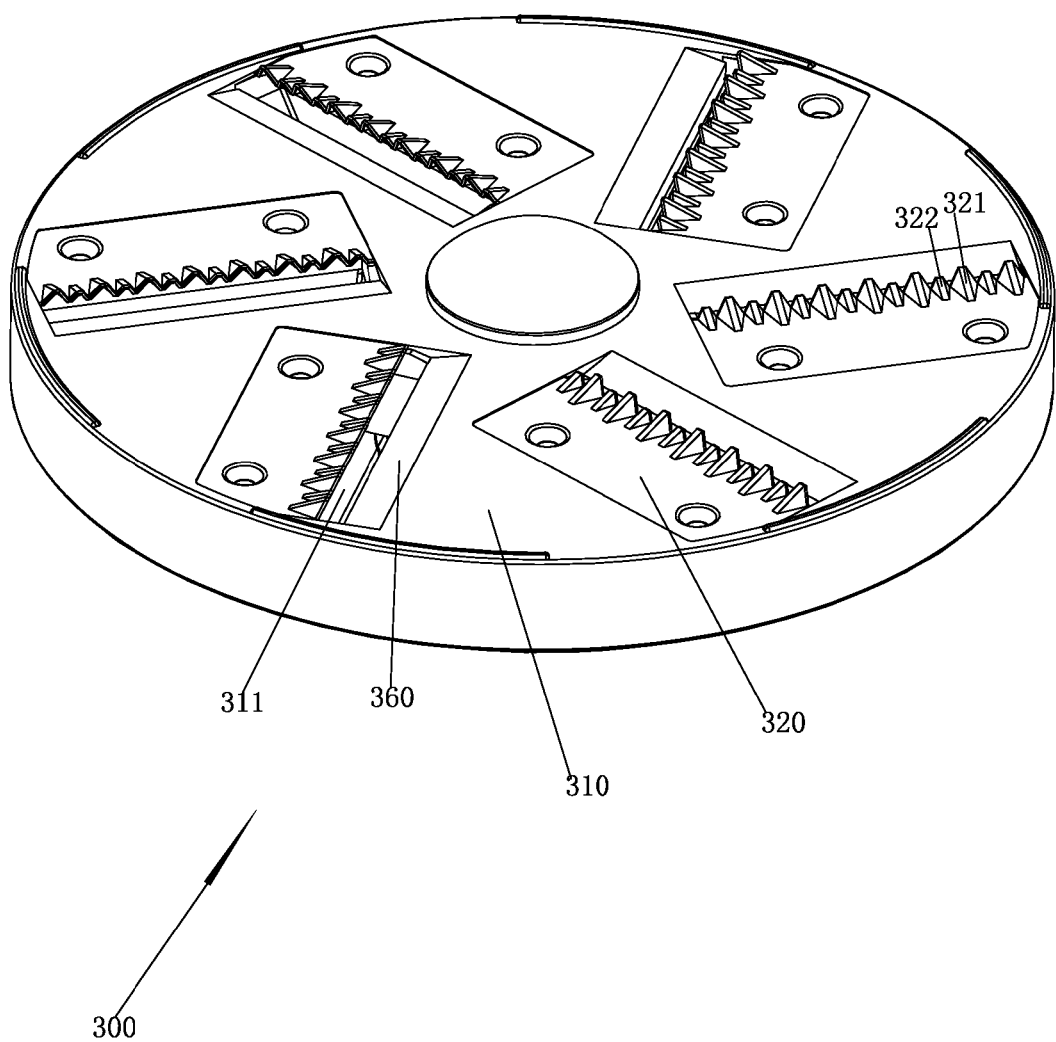
FIG. 8 illustrates a first schematic diagram of the cutter of the food processor of the second embodiment of the present invention.
Figure 9:
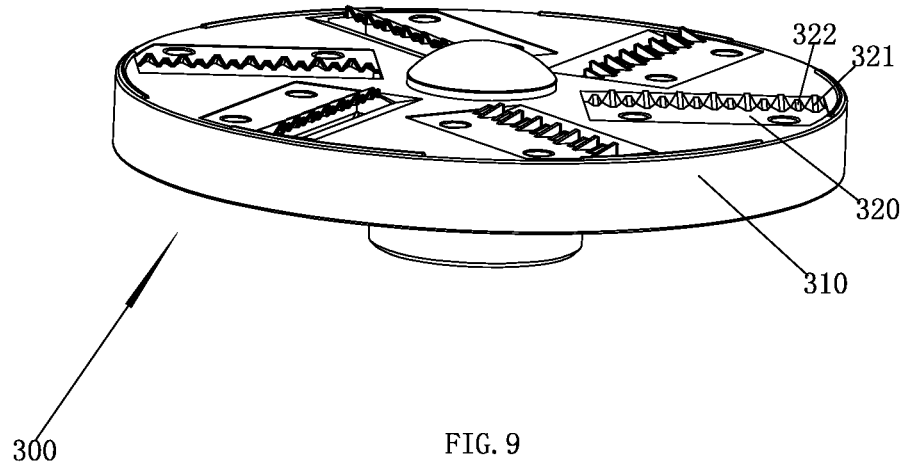
FIG. 9 illustrates a second schematic diagram of the cutter of the food processor of the second embodiment of the present invention.
Figure 10:
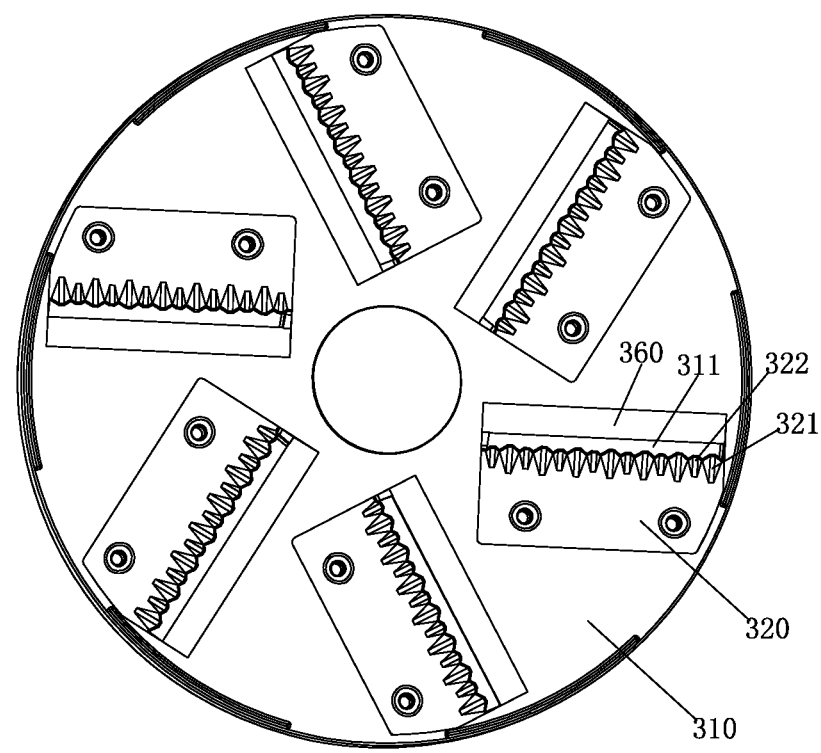
FIG. 10 illustrates a top view of the cutter of the food processor of the second embodiment of the present invention.

Please refer to FIG. 8 to FIG. 10, disclosed is a food professor in the second embodiment. In this embodiment, the dropping grooves 311 pass through the cutter dish 310 from up to down and the number of the dropping grooves 311 is the same as the blades 320 and the dropping grooves 311 are arranged in an annular, the blade 320 comprises a blade body coupled to assemble to the cutter dish 310, the several sets of cutter teeth are convex and disposed in the edge of the blade body, the dropping groove 311 has a left side and a right side, and the several sets of cutter teeth are aligned with the left side of the dropping groove 311.

In this embodiment, the large cutter tooth 321 and the small cutter tooth 322 are respectively have a front portion and a rear portion connected to the front portion. The front portion is a trapezoid, the rear portion has three sides of triangle, rectangle, triangle shaped connected in order. This kind of structure thus makes hard food, such as ice or fruit ice, processed to be fine ice shaker, granule crushed ice or shaves ice, it is of simple structure and low in cost.

In this embodiment, the height of the large cutter tooth 321 is different from that of the small cutter tooth 322, the distance between the left and the right side of the large cutter tooth 321 is different from that of the small cutter tooth 322, and the distance between the front side and the back side of the large cutter tooth 321 is different from that of the small cutter tooth 322.

Figure 12:
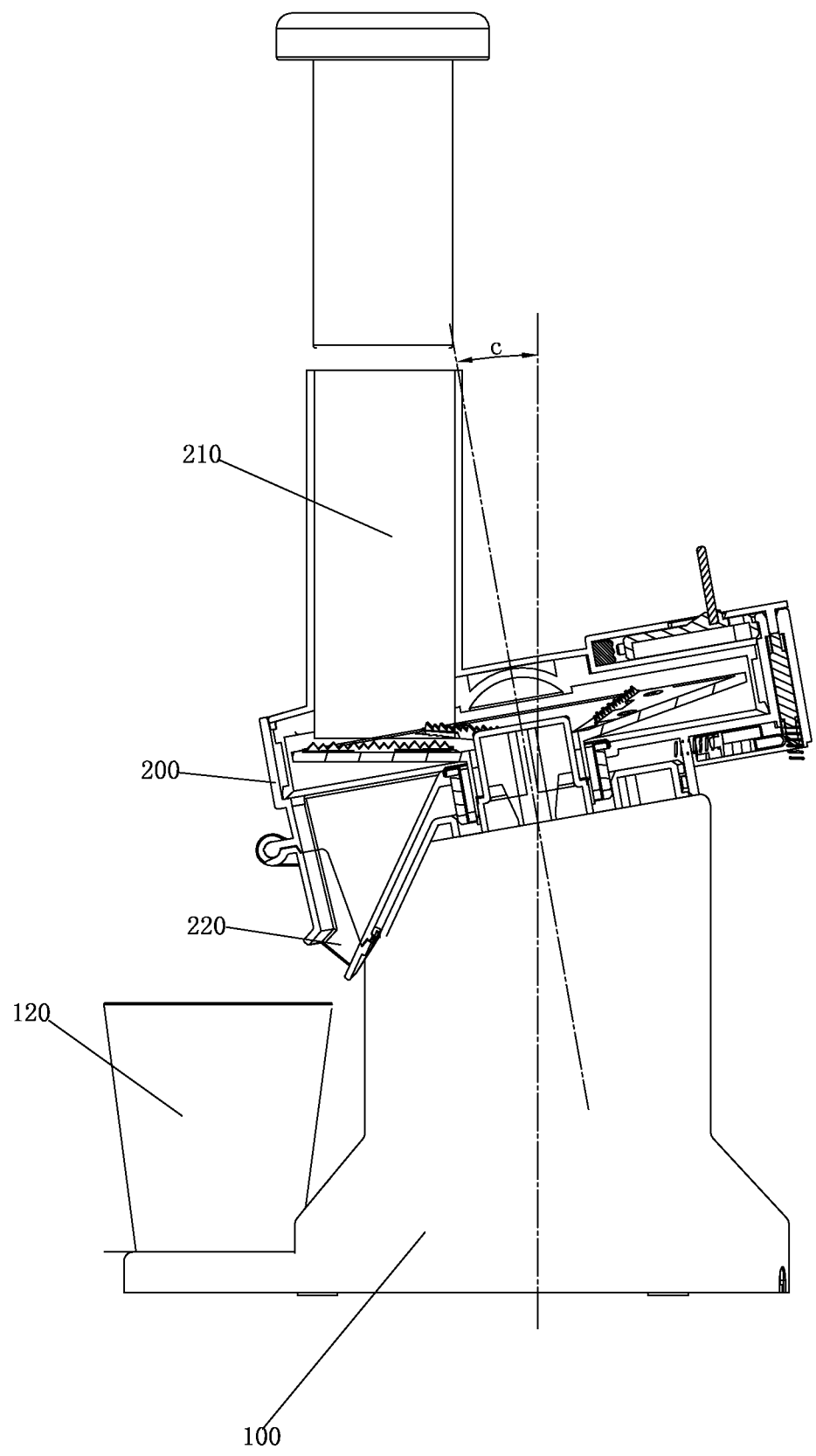
FIG. 12 illustrates a partial sectional view of the food processor of the third embodiment of the present invention.
Figure 13:
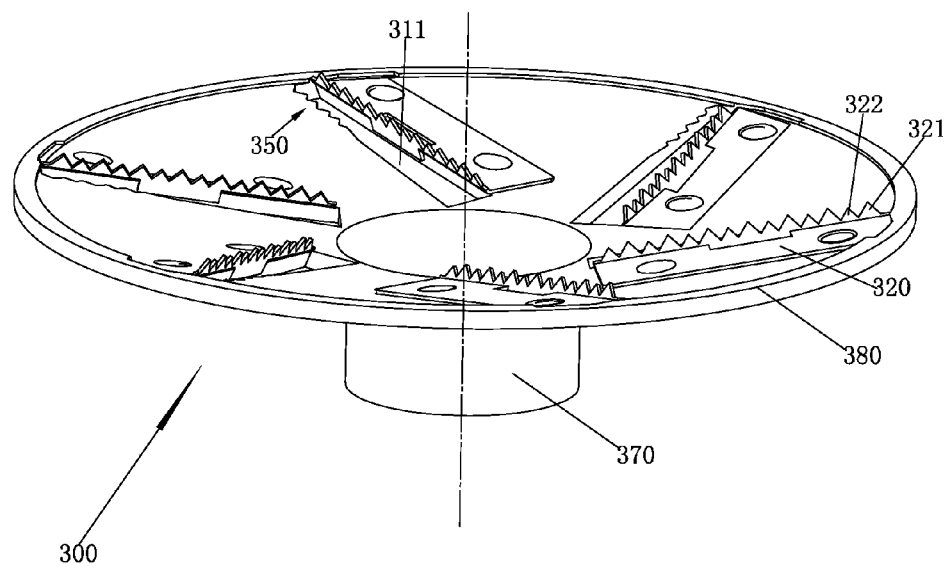
FIG. 13 illustrates a schematic diagram of the cutter of the food processor of the third embodiment of the present invention.
Figure 14:
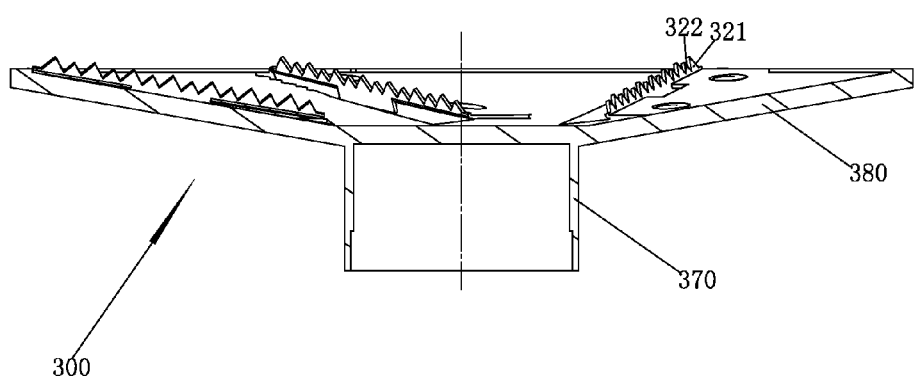
FIG. 14 illustrates a sectional view of the cutter of the food processor of the third embodiment of the present invention.

Please refer to FIG. 12 to FIG. 14, disclosed is a food processor in the third embodiment, the cutter dish 310 has a shaft sleeve 370 and an annular wall 380 extended from the top end face of the shaft sleeve 370, the dropping groove 311 is disposed on the wall 380, and the blades 320 are assembled on the wall 380, the diameter of the wall 380 gradually tapers from up to down. In this embodiment, the concave portions of the convex-concave structure 350 are corresponding to part of the several sets of cutter teeth one by one.

Preferred, an inclined guiding surface 360 is disposed at the connection portion of the cutter dish 310 and the right side of the dropping groove 311.

In this embodiment, the processing box 200 is assembled on the base 100, and the central line of the processing box 200 and the central line of the base 100 have an intersection angle c. That is to say, the intersection angle c is the intersection angle of the axis of the rotating shaft of the motor and the central line of the base 100. Preferred, the intersection angle c ranges from 7 to 15 degrees. The cutter dish has a shaft sleeve and an annular wall, the diameter of the wall gradually tapers from up to down, this kind of cutter dish is more convenient for hard food, such as ice or fruit ice, to drop to the discharging opening, it is better when the axis of the rotating shaft of the motor is out of alignment with the central line of the base.

Figure 11:
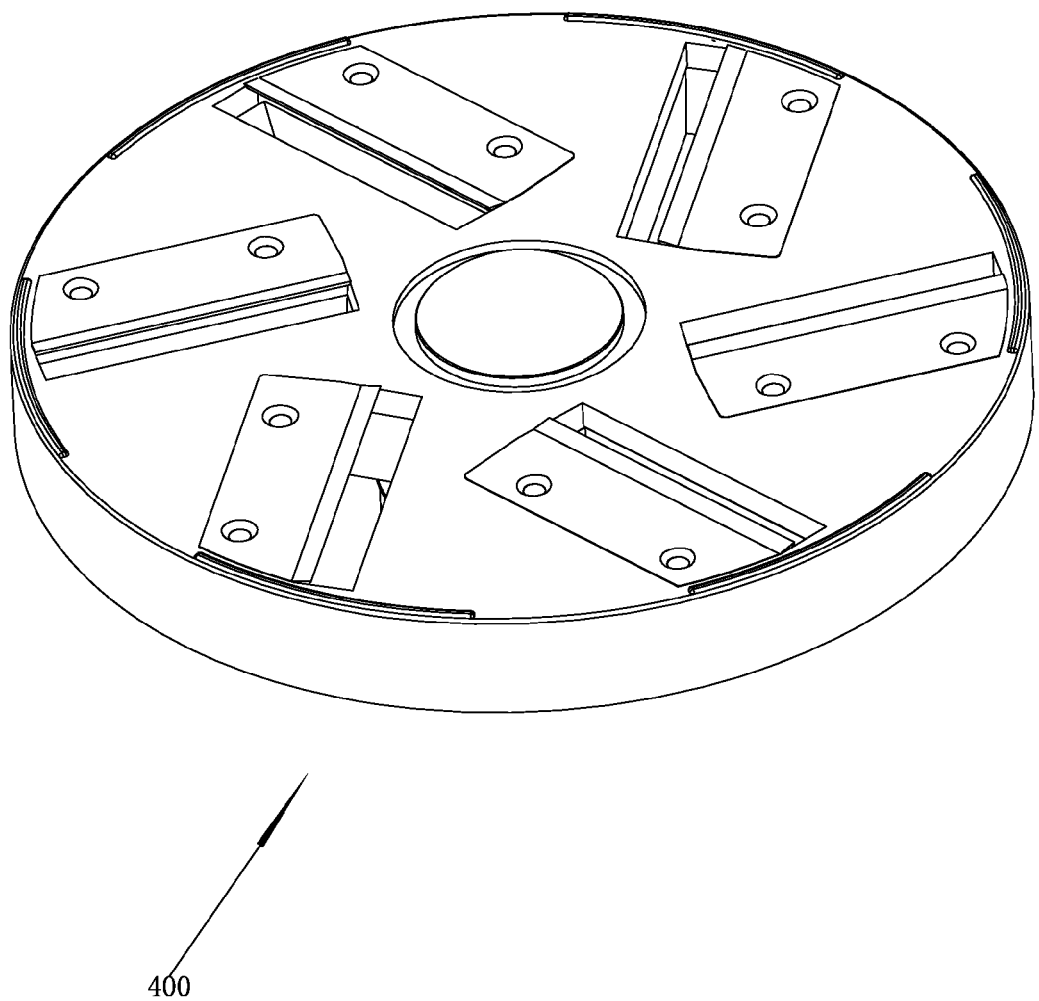
FIG. 11 illustrates a schematic diagram of an ice crusher cutter.

The food professor of the present invention can have the cutter in the first embodiment and the cutter in the second embodiment at the same time, or it can further comprise a normal cutter 400 to process hard food as figured in FIG. 11. The blade of the normal cutter 400 is a conventional blade without teeth. So that the food professor can make ice cream, fruit cream, fruit ice cream, slush ice, ice shake, crushed ice, shaves ice and other ice food by adding ice, it can make hard food to be soft and fine, thus satisfying costumers' needs. In other situations, the food processor can be designed as the third embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

What is claimed is:

1. A food processor comprising:
    a base (100), which is disposed with a motor (110) inside, the motor (110) is disposed with a rotating shaft;
    a processing box (200), which is assembled to the base (100) and is disposed with a charging opening (210) and a discharging opening (220); and
    at least one cutter (300), which rotates synchronously with the rotating shaft of the motor (110), the cutter (300) is assembled inside the processing box (200) and is disposed with a cutter dish (310) with a plurality of grooves (311), respectively adjacent to a plurality of blades (320) fixed on the cutter dish (310), each of the plurality of blades (320) is provided with a plurality of sets of cutter teeth arranged side by side, each set of cutter teeth has at least a large cutter tooth (321) and at least a small cutter tooth (322).

2. A food processor according to claim 1, wherein the plurality of grooves (311) pass through the cutter dish (310) from up to down and the number thereof is the same as the plurality of blades (320), the plurality of grooves (311) are arranged in an annular, each of the plurality of blades (320) comprises an assembly portion (330) coupled to the cutter dish (310) and a cutter portion (340) fixed to the assembly portion (330), the plurality of sets of cutter teeth are disposed in the upper end of the cutter portion (340), each of the plurality of grooves (311) has two sides, the left side and the right side, the lower end of each of the cutter portions (340) is extended into each said plurality of grooves (311) and is coupled to contact on the left side of each said plurality of grooves (311), the upper end of the cutter portion (340) is extended out of the assembly portion (330).

3. A food processor according to claim 2, wherein the left side of each said plurality of grooves (311) is an inclined surface, an intersection angle α of the inclined surface and a vertical line of the assembly portion ranges from 20 to 30 degrees.

4. A food processor according to claim 3, wherein the intersection angle α of the inclined surface of each said plurality of grooves (311) and the vertical line of the assembly portion is 22.5 degree.

5. A food processor according to claim 2, wherein a dropping opening is formed between each said plurality of grooves (311) and the top surface of the cutter dish (310), the distance b of the left side and the right side of the dropping opening ranges from 2.5 to 6.5 mm.

6. A food processor according to claim 2, wherein the right side of each said plurality of grooves (311) is disposed with teeth convex-concave structure (350), the concave portions of the convex-concave structure (350) are corresponding to part or whole of the plurality of sets of cutter teeth one by one.

7. A food processor according to claim 1, wherein the height of the large cutter tooth (321) is different from that of the small cutter tooth (322), the distance between the left side and the right side of the large cutter tooth (321) is different from that of the small cutter tooth (322)

and/or the distance between the front side and back side of the large cutter tooth (321) is different from that of the small cutter tooth (322).

8. A food processor according to claim 1, wherein each set of cutter teeth has a large cutter tooth (321) and a small cutter tooth (322), or two large cutter teeth (321) and two small cutter teeth (322) or three large cutter teeth (321) and three cutter teeth (322) in order.

9. A food processor according to claim 1, wherein the large cutter teeth have a trapezoid and three sides of a triangle, and the small cutter teeth have a rectangle and a triangle.

10. A food processor according to claim 1, wherein the cutter dish (310) has a shaft sleeve (370) and an annular wall (380) extended from the top end face of the shaft sleeve (370), each said plurality of grooves (311) is disposed on the wall (380), and the blades (320) are assembled on the wall (380), the diameter of the wall (380) gradually tapers from up to down.

11. A food processor according to claim 1, wherein the processing box (200) comprises a lower box (280), a central cover (291) with an opening and an upper box (290) covering the lower box (280) and situated on the central cover (291), an accommodating room (293) is formed between the central cover (291) and the lower box (280), the internal periphery of the lower box (280) is a vertical surface, the upper portion and the lower portion of the external periphery of the central cover (291) are contacted tightly with the lower box (280), the central portion of the external periphery of the central cover (291) is hollow to be a cavity (294), the charging opening (210) is disposed in the upper box (290) and corresponding to the opening of the central cover (291), the discharging opening (220) is disposed in the lower box (280), the cutter (300) is assembled inside the accommodating room (293) formed between the central cover (291) and the lower box (280).

12. A food processor according to claim 11, wherein the external periphery of the central cover (291) is disposed with at least an annular protruding portion (292).

13. A food processor comprising:

a base, which is disposed with a motor inside, the motor is disposed with a rotating shaft;

a processing box, which is assembled to the base and is disposed with a charging opening and a discharging opening; and at least one cutter, which rotates synchronously with the rotating shaft of the motor, the cutter is assembled inside the processing box and is disposed with a cutter dish with a plurality of grooves, respectively adjacent to a plurality of blades fixed on the cutter dish, a each of the plurality of blades is provided with a plurality of sets of cutter teeth arranged side by side, wherein each set of cutter teeth has
either a large cutter tooth and a small cutter tooth,
or two large cutter teeth and two small cutter teeth,
or three large cutter teeth and three cutter teeth in order.

* * * * *